US011328427B2

(12) United States Patent
Sun et al.

(10) Patent No.: US 11,328,427 B2
(45) Date of Patent: May 10, 2022

(54) BORDER DETECTION METHOD, SERVER AND STORAGE MEDIUM (71) Applicant: TENCENT TECHNOLOGY (SHENZHEN) COMPANY LIMITED, Guangdong (CN)

(72) Inventors: Xing Sun, Shenzhen (CN); Rui Wang, Shenzhen (CN); Xiaowei Guo, Shenzhen (CN)

(73) Assignee: TENCENT TECHNOLOGY (SHENZHEN) COMPANY LTD, Shenzhen (CN)

(*) Notice: Subject to any disclaimer, the term of this patent is extended or adjusted under 35 U.S.C. 154(b) by 225 days.

(21) Appl. No.: 16/578,672

(22) Filed: Sep. 23, 2019

(65) Prior Publication Data
US 2020/0020105 A1 Jan. 16, 2020

Related U.S. Application Data (63) Continuation of application No. PCT/CN2018/102581, filed on Aug. 27, 2018.

(30) Foreign Application Priority Data

Sep. 26, 2017 (CN) .......................... 201710882948.8

(51) Int. Cl.
*G06T 7/13* (2017.01)
*G06K 9/62* (2022.01)
(52) U.S. Cl.
CPC .............. *G06T 7/13* (2017.01); *G06K 9/6215* (2013.01); *G06K 9/6263* (2013.01);
(Continued)
(58) Field of Classification Search
None
See application file for complete search history.

(56) References Cited

U.S. PATENT DOCUMENTS

| 7,171,047 B2 | 1/2007 | Grinchuk et al. |
| 9,965,678 B2 * | 5/2018 | Fang .......................... G06T 7/13 |

(Continued)

FOREIGN PATENT DOCUMENTS

| CN | 103399695 A | 11/2013 |
| CN | 103500337 A | 1/2014 |

(Continued)

OTHER PUBLICATIONS

Fan, Jian: "Detection of quadrilateral document regions from digital photographs", 2016 IEEE Winter Conference on Applications of Computer Vision (WACV), IEEE, Mar. 7, 2016 (Mar. 7, 2016), pp. 4321-4329, XP032904350) reference provided by applicant (Year: 2016).*

(Continued)

*Primary Examiner* — Anand P Bhatnagar
(74) *Attorney, Agent, or Firm* — Sughrue Mion, PLLC (57) ABSTRACT Provided is a border detection method, server, and storage medium. The method including detecting a plurality of first straight line segments in a to-be-detected image, the to-be-detected image comprising a target region of a to-be-determined border; generating a plurality of first candidate borders of the target region according to the plurality of first straight line segments; obtaining a plurality of second candidate borders of the target region from the plurality of first candidate borders; extracting border features of the plurality of second candidate borders; and obtaining an actual border of the target region from the plurality of second candidate borders according to the border features of the plurality of second candidate borders and a border detection model, the border detection model being used to determine a detected value of each candidate border, and the detected value representing a similarity between each candidate border and the actual border.

20 Claims, 5 Drawing Sheets (52) U.S. Cl.
CPC ......... *G06K 9/6269* (2013.01); *G06K 9/6286* (2013.01); *G06T 2207/20061* (2013.01); *G06T 2207/30176* (2013.01)

(56) References Cited

U.S. PATENT DOCUMENTS

| | | | |
|---|---|---|---|
| 10,281,259 B2 * | 5/2019 | Bridges | G01B 21/047 |
| 10,657,600 B2 * | 5/2020 | Macciola | G06T 7/143 |
| 10,783,615 B2 * | 9/2020 | Ma | G06T 3/00 |
| 10,902,277 B2 * | 1/2021 | Agarwal | G06F 3/04815 |
| 10,929,980 B2 * | 2/2021 | Fiala | G06F 30/20 |
| 2005/0078192 A1 | 4/2005 | Sakurai et al. | |
| 2005/0088695 A1 * | 4/2005 | Fuchigami | H04N 1/40062 358/2.1 |
| 2008/0199082 A1 | 8/2008 | Tanaka et al. | |
| 2013/0322769 A1 * | 12/2013 | Pan | G06K 9/32 382/199 |
| 2014/0126811 A1 | 5/2014 | Ihara | |
| 2016/0343142 A1 * | 11/2016 | Gaiha | G06T 7/12 |
| 2017/0249745 A1 * | 8/2017 | Fiala | A63F 13/25 |
| 2019/0087942 A1 * | 3/2019 | Ma | G06K 9/36 |
| 2020/0090338 A1 * | 3/2020 | Fiala | G02B 27/0172 |
| 2020/0394763 A1 * | 12/2020 | Ma | G06T 5/002 |

FOREIGN PATENT DOCUMENTS

| | | |
|---|---|---|
| CN | 103813050 A | 5/2014 |
| CN | 104504684 A | 4/2015 |
| GN | 101246549 A | 8/2008 |

OTHER PUBLICATIONS

International Search Report for PCT/CN2018/102581 dated, Nov. 30, 2018 (PCT/ISA/210).
Jian Fan, "Detection of Quadrilateral Document Regions from Digital Photographs", 2016 IEEE Winter Conference on Applications of Computer Vision (WACV), Mar. 7, 2016 (Mar. 7, 2016), XP032904350, pp. 4321-4329 (9 pages total).
Extended European Search Report dated Dec. 2, 2020 from the European Patent Office in Application No. 18860902.8.
Communication dated Dec. 22, 2020 from the European Patent Office in Application No. 18860902.8.
Written Opinion dated Nov. 30, 2018 from the International Searching Authority in International Application No. PCT/CN2018/102581.
Office Action dated Mar. 3, 2022 in European Application No. 18860902.8.

* cited by examiner

BORDER DETECTION METHOD, SERVER AND STORAGE MEDIUM

CROSS-REFERENCE TO RELATED APPLICATIONS

This application is a continuation of International Patent Application No. PCT/CN2018/102581 filed on Aug. 27, 2018, which claims priority from Chinese Patent Application No. 201710882948.8, entitled "BORDER DETECTION METHOD, APPARATUS, AND STORAGE MEDIUM" and filed in the Chinese Patent Office on Sep. 26, 2017, which are incorporated herein by reference in their entireties.

BACKGROUND

1. Field

Embodiments of the present disclosure relate to the field of image processing technologies, and in particular, to a border detection method, a server, and a storage medium.

2. Description of Related Art

With development of image processing technologies, an increasing quantity of terminals with a photographing function gradually enter into daily lives of users. Without the aid of devices, such as a copying machine and a fax machine, a terminal may photograph various documents and certificates to obtain and store images of the documents, the certificates, and the like. The terminal may perform border detection on the images to obtain regions where the documents, certificates, and the like are located, so as to obtain specific content of the documents, certificates, and the like from the regions.

In the related technology, a border detection method may be include detecting first straight line segments in a to-be-detected image, the to-be-detected image including a target region of a to-be-determined border, connecting the detected first straight line segments through Haugh transform to form second straight line segments, lengths of the second straight line segments being greater than lengths of the first straight line segments, obtaining, in the connected second straight line segments, second straight line segments located four positions, namely, leftmost, rightmost, uppeii lost, and lowermost positions in the to-be-detected image, and connecting the obtained four second straight line segments to form an actual border of the target region.

In a process of implementing this application, a person may find that, in a certificate, a document, or the like to be photographed, there is usually a specific background, such as dark and light lines in the background, often affecting detection performed by the terminal on a region where the document or the certificate is located, and resulting in an inaccurate detection result.

SUMMARY

To improve accuracy of a detection result during border detection, embodiments of the present disclosure provide a border detection method, a server, and a storage medium.

According to an embodiment, there is provided a border detection method, the method being performed by a server, the method including: detecting a plurality of first straight line segments in a to-be-detected image, the to-be-detected image comprising a target region of a to-be-determined border; generating a plurality of first candidate borders of the target region according to the plurality of first straight line segments; obtaining a plurality of second candidate borders of the target region from the plurality of first candidate borders; extracting border features of the plurality of second candidate borders; and obtaining an actual border of the target region from the plurality of second candidate borders according to the border features of the plurality of second candidate borders and a border detection model, the border detection model being used to determine a detected value of each candidate border, and the detected value representing a similarity between each candidate border and the actual border.

According to another embodiment, there is provided a border detection server, the server including at least one memory configured to store computer program code and at least one processor configured to access the computer program code and operate as instructed by the computer program code, the computer program code including line segment detection code configured to cause the at least one processor to detect a plurality of first straight line segments in a to-be-detected image, the to-be-detected image comprising a target region of a to-be-determined border; candidate border generation code configured to cause the at least one processor to generate a plurality of first candidate borders of the target region according to the plurality of first straight line segments; candidate border obtaining code configured to cause the at least one processor to obtain a plurality of second candidate borders of the target region from the plurality of first candidate borders; feature extraction code configured to cause the at least one processor to extract border features of the plurality of second candidate borders; and actual border obtaining code configured to cause the at least one processor to obtain an actual border of the target region from the plurality of second candidate borders according to the border features of the plurality of second candidate borders and a border detection model, the border detection model being used to determine a detected value of each candidate border, and the detected value representing a similarity between each candidate border and the actual border.

According to another embodiment, there is provided a non-transitory computer-readable storage medium, storing executable instructions, the executable instructions capable of causing a computer to: detect a plurality of first straight line segments in a to-be-detected image, the to-be-detected image comprising a target region of a to-be-determined border; generate a plurality of first candidate borders of the target region according to the plurality of first straight line segments; obtain a plurality of second candidate borders of the target region from the plurality of first candidate borders; extract border features of the plurality of second candidate borders; and obtain an actual border of the target region from the plurality of second candidate borders according to the border features of the plurality of second candidate borders and a border detection model, the border detection model being used to determine a detected value of each candidate border, and the detected value representing a similarity between each candidate border and the actual border.

The technical solutions provided in the embodiments herein bring about the following beneficial effects.

A to-be-detected picture may be detected to generate first candidate borders, second candidate borders may be selected from the first candidate borders. Further, an actual border of a target region may be obtained according to border features of the second candidate borders and a border detection model. The method may not depend on a selection rule, and instead, a detection may be performed based on border features and a border detection model. Therefore, a detection result may be more accurate.

BRIEF DESCRIPTION OF THE DRAWINGS

To describe the technical solutions in the embodiments of the present disclosure more clearly, the following is described with reference to the accompanying drawings. Apparently, the accompanying drawings in the following description show merely some embodiments of this application, and a person of ordinary skill in the art may still derive other embodiments from these accompanying drawings without creative efforts.

DESCRIPTION OF EMBODIMENTS

To make the objectives, technical solutions, and advantages of the embodiments of the present disclosure clearer, the following describes the embodiments in detail with reference to the accompanying drawings.

Before detailed description, concepts included in the embodiments may be explained as follows, but not limited hereto.

Hough transform may be a feature extraction technology in image processing, in which a local maximum of a cumulative result is calculated in a parameter space, to obtain a set conforming to a specific shape as a Hough transform result. Hough transform may often be used in straight line, curved line, or circle detection.

Support Vector Machines (SVMs) may be implemented in machine learning. SVMs are a supervised learning method for statistical classification and regression analysis. SVMs are generalized linear classifiers capable of constructing hyperplanes or hyperplane sets in a high-dimensional or infinite-dimensional space while minimizing empirical errors and maximizing geometric edge regions. Therefore, SVMs may be also referred to as maximum margin classifiers.

Line Segment Detector (LSD) may be a sub-pixel-level local straight contour detection result that may be obtained in a linear time. The algorithm does not require parameter adjustment during straight line detection in any image.

Feature detection may relate to image information that is analyzed based on computer and mathematical methods to determine whether each point in the image belongs to an image feature. The feature detection may be implemented by dividing points on the image into different subsets, and the subsets usually belong to isolated points, continuous curves, or continuous regions. Feature detection may often be used in the fields, such as computer vision and image processing.

Color Image Segmentation (MeanShiftFiltering): Meanshift can be used for image filtering, and can also be used for video tracking or image segmentation. Generally, a feature point extracted from one picture have at least five dimensions, that is, (x, y, r, g, b), where x and y are coordinates in a two-dimensional plane, and r, g, and b are three color channels. Meanshift is often used to find a modal point, that is, a point with the highest density in a picture. Therefore, in a case that a modal point of a five-dimensional space analyzed based on Meanshift, because different points eventually converge to different peaks, the different points may be grouped into different classes to achieve an objective of image segmentation.

Figure 1:
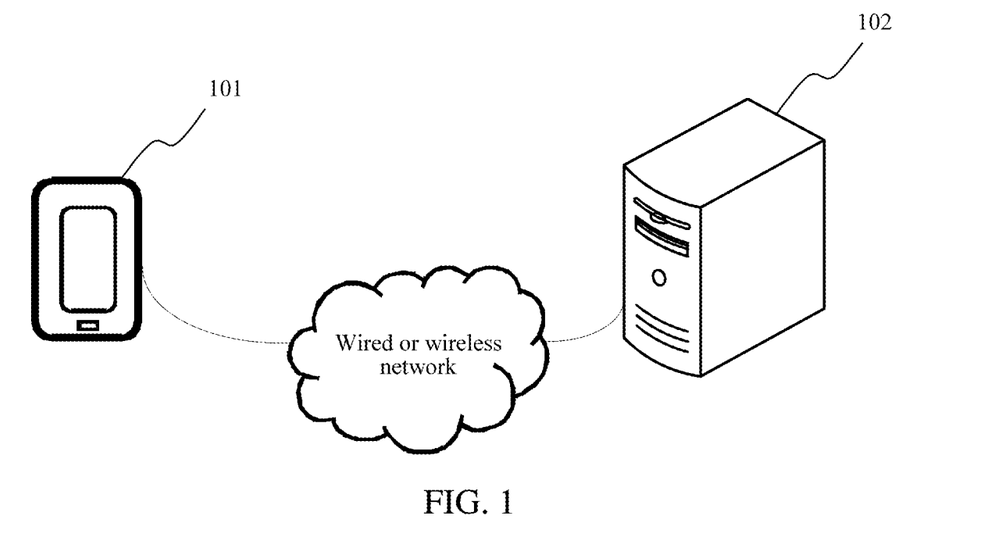
FIG. 1 is an implementation environment related to a border detection method according to an embodiment.

Referring to FIG. 1, which shows an implementation environment related to a border detection method according to an embodiment, the implementation environment may include a terminal 101 and a server 102.

The terminal 101 may be device, such as a smartphone, a tablet computer, or a notebook computer. A product type of the terminal is not specifically limited to the embodiments herein. A picture border detection application may be installed in the terminal 101, and based on the picture border detection application, the terminal 101 may transmit a to-be-detected picture stored in a local memory to the server 102.

The server 102 may be a server corresponding to the picture border detection application. The server 102 may receive, through the border detection application, the to-be-detected picture transmitted by the terminal 101, perform detection and recognition on the to-be-detected picture to obtain an actual border of a target region in the to-be-detected picture, and feedback a recognition result to the terminal 101. The server 102 may include a straight line segment detection module, a candidate border generation module, a candidate border fusion and filtration module, and an SVM classification module. The straight line segment detection module may be configured to detect the to-be-detected picture to obtain straight line segments. The candidate border generation module may be configured to generate candidate borders according to the detected straight line segments. The candidate border fusion and filtration module may be configured to sift the generated candidate borders. The SVM classification module may be configured to obtain an actual border of the target region in the to-be-detected picture from the sifted candidate borders according to border features and a border detection model The terminal 101 and the server 102 may communicate with each other through a wired network or a wireless network.

Figure 2:
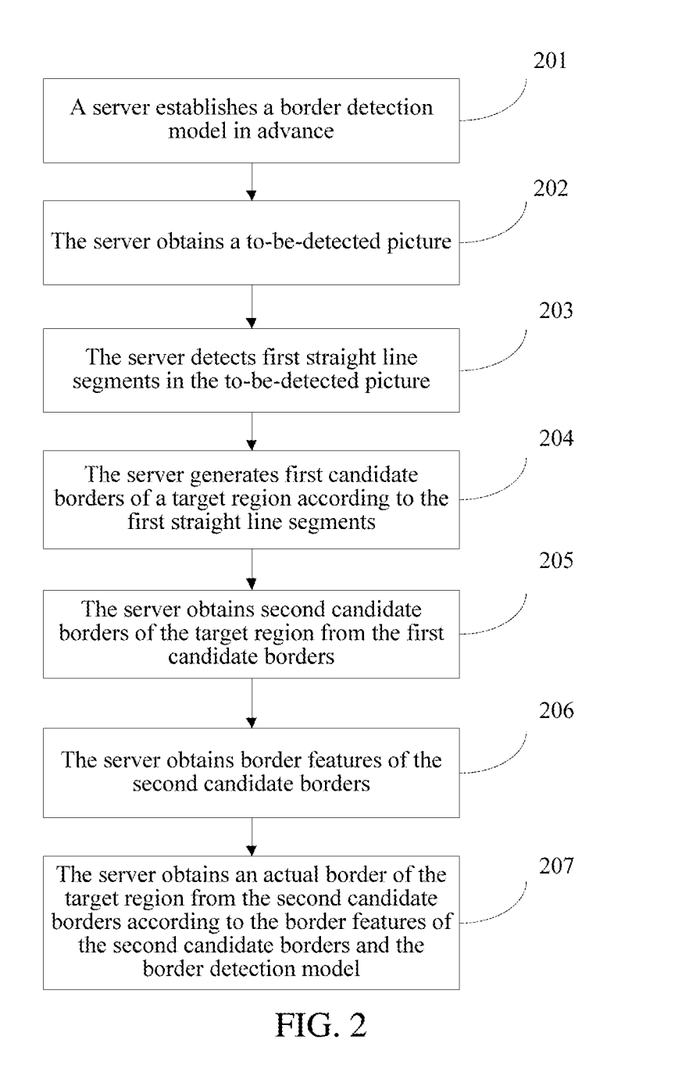
FIG. 2 is a flowchart of a border detection method according to an embodiment.

Referring to FIG. 2, the border detection method provided in this embodiment may include the following operations.

In step 201, a server may establish a border detection model in advance.

In a case that the server establishes the border detection model, steps 201(a) to 201(f) described below may be used.

In step 201(a), the server may detect first reference straight line segments in a reference picture.

The reference picture may include a reference region, and an actual border of the reference region that has been determined. A quantity of reference pictures may depend on a processing capability of the server, and the quantity of the reference pictures may be 1000, 2000, 3000, or more or less. Here, the quantity of the reference pictures is not specifically defined. In response to obtaining a reference picture, the server may obtain a plurality of pictures in which actual borders have been determined, and using the plurality of obtained pictures as reference pictures.

According to an embodiment, two types of pictures may be included: one may be a reference picture and the other may be a to-be-detected picture. Functions of the reference picture and the to-be-detected picture may be different. For example, an actual border in a reference picture is used to establish a border detection model. An actual border of a to-be-detected picture needs to be determined by performing the method described herein.

For each reference picture, the server may perform detection by using the LSD, to obtain first reference straight line segments. A quantity of the first reference straight line segments is at least two.

In step 201(b), the server may generate first reference candidate borders of the reference region according to the first reference straight line segments.

According to an embodiment, lengths of the first reference straight line segments are relatively short, and the first reference straight line segments may be connected into second reference straight line segments, so as to further constitute first reference candidate borders of the reference region based on the second reference straight line segments. In a case that the server generates first reference candidate borders of the reference region according to the first reference straight line segments, the following steps 201(b)(i) to 201(b)(iii) may be used.

In step 201(b)(i), the server may connect the first reference straight line segments to obtain second reference straight line segments.

Lengths of the first reference straight line segments are less than lengths of the second reference straight line segments. During actual connecting, the server may directly connect first reference straight line segments meeting connecting conditions into second reference straight line segments through Hough transform. The connecting conditions may include a slope, a distance, and the like. Specifically, for any two first reference straight line segments, slopes of the two first reference straight line segments may be respectively calculated, and a distance between the two first reference straight line segments may be calculated. In a case that the distance between the two first reference straight line segments is less than a first threshold, and a difference between the slopes of the two first reference straight line segments is less than a second threshold, the two first reference straight line segments are connected, and all the first reference straight line segment meeting the connecting conditions may be connected according to a method for connecting the two first reference straight line segments, to obtain at least one second reference straight line segment. The first threshold and the second threshold may be determined according to processing precision of the Hough transform.

In step 201(b)(ii), the server may obtain third reference straight line segments from the second reference straight line segments according to attribute information of a to-be-generated first reference candidate borders.

The attribute information may include a quantity of borders and a relative positional relationship between borders of the first reference candidate borders. There is a plurality of groups of third reference straight line segments, a quantity of the third reference straight line segments of each group is the same as the quantity of borders, and a relative positional relationship between the third reference straight line segments of each group is the same as the relative positional relationship between borders.

To obtain a third reference straight line segment according to a relative positional relationship between borders of each border in the first reference candidate borders, the server may calculate an angle between each second reference straight line segment and a horizontal direction, so as to determine a direction of each second reference straight line segment according to the angle between each second reference straight line segment and the horizontal direction. For example, for any second reference straight line segment, in a case that the angle between the second reference straight line segment and the horizontal direction is less than 45 degrees, a direction of the second reference straight line segment may be determined to be in a horizontal direction. In a case that an angle between the second reference straight line segment and the horizontal direction is greater than 45 degrees and less than 90 degrees, a direction of the second reference straight line segment may be determined to be in a vertical direction.

In a case that the server obtains third straight line segments from the second straight line segments according to attribute information of to-be-generated first candidate borders, the following method may be used. The method may include setting a quantity of the second reference straight line segments to n, where directions of m second reference straight line segments are in a horizontal direction, directions of n−m second reference straight line segments are vertical directions (m and n natural numbers, and n>m), and a quantity of borders of the first reference candidate borders is k, a relative positional relationship between the k borders may be that a quantity of a borders are parallel in a horizontal direction, and k−a borders are parallel in a vertical direction (k and a are natural numbers, and n>k>a), so that the server randomly obtains a second reference straight line segments from m second reference straight line segments in the horizontal direction, which is represented as, $C_m^a$ randomly obtains k−a second reference straight line segments from n−m second reference straight line segments in the vertical direction, which may be represented as, $C_{n-m}^{k-a}$, and uses the a obtained second reference straight line segments in the horizontal direction and the k−a second reference straight line segments in the vertical direction as a group of third reference straight line segments.

For example, when a quantity of borders of the first reference candidate borders is four, two borders of the four borders are parallel in the horizontal direction, and the other two borders are parallel in the vertical direction. Further, a quantity of second reference straight line segments may be 24, where directions of 10 second reference straight line segments are horizontal directions, directions of 14 second reference straight line segments are vertical directions. The server may randomly obtain two second reference straight line segments from 10 second reference straight line segments in the horizontal direction, randomly obtain two second reference straight line segments from 14 second reference straight line segments in the vertical direction, and group the two second reference straight line segments in the horizontal direction and the two second reference straight line segments in the vertical direction as a group of third reference straight line segments.

In step 201(b)(iii), the server may generate the first reference candidate borders according to the third reference straight line segments.

The server may generate a first reference candidate border based on the obtained group of third reference straight line segments. A quantity of the first reference candidate borders generated by the server may be represented as $C_m^a * C_{n-m}^{k-a}$.

In step 201(c), the server may obtain a second reference candidate border of the reference region from the first reference candidate borders.

The second reference candidate border may correspond to one tag value, and the tag value may be used to determine whether the second candidate border is an actual border of reference region. The tag value may be 0 or 1. If the tag value is 0, it indicates that the second reference candidate border is an actual border of the reference region. If the tag value is 1, it indicates that the second reference candidate border is not an actual border of the reference region.

In a case that the server obtains a second reference candidate border of the reference region from the first reference candidate borders, the following steps 201(c)(i) to 201(c)(vii) may be performed.

In step 201(c)(i), the server may obtain aspect ratios of the first reference candidate borders.

For a first reference candidate border enclosed by each group of third reference straight line segments, the server may obtain a width value and a height value of each first reference border, so as to obtain an aspect ratio of each first reference candidate border.

In step 201(c)(ii), the server may obtain third reference candidate borders from the first reference candidate borders according to the aspect ratios of the first reference candidate borders.

For a second reference candidate border in the reference region, its aspect ratio falls within a threshold range, and based on the threshold range, the server may select a first reference candidate border meeting the threshold range from the first reference candidate borders, and use the first reference candidate border meeting the threshold range as a third reference candidate border. The threshold range may be determined according to a shape of the second candidate border. For example, a threshold range of an aspect ratio of a rectangle may be set to 0.1 to 1. In a case that a shape of a first reference candidate border is a rectangle, its aspect ratio may be 0.5, and the aspect ratio falls within the threshold range of an aspect ratio of a rectangle. As such, the first reference candidate border may be used as a third reference candidate border.

In step 201(c)(iii), the server may obtain border areas of the third reference candidate borders.

The server may calculate border areas of the third reference candidate borders according to an area formula based on the shape of the border areas.

In step 201(c)(iv), the server may sort the third reference candidate borders in ascending order according to the border areas to obtain a sorting result.

After border areas of all the third reference candidate borders are calculated, the server may sort the third reference candidate borders in ascending order according to the border areas to obtain a sorting result. In step 201(c)(v), the server may divide the third reference candidate borders into a plurality of reference candidate border groups according to the sorting result.

Based on the obtained sorting result, to facilitate group division, the server may number the third reference candidate borders, so as to further divide the third reference candidate borders into different reference candidate border groups according to a number set for each third reference candidate border.

For example, a quantity of the third reference candidate borders may be 1000, and numbered from 1 to 1000. The quantity of third reference candidate borders of each group may be set to 100, so that the server may sequentially number respective third reference candidate borders according to a sorting result, group third reference candidate borders that are numbered from 1 to 100 into a first reference candidate border group, group third reference candidate borders that are numbered from 101 to 200 into a second reference candidate border group, and group third reference candidate borders that are numbered from 901 to 1000 into another reference candidate border group.

In step 201(c)(vi), the server may obtain, from all the reference candidate border groups, third target reference candidate borders having a same sort position in the groups.

Because all reference candidate border groups include a same quantity of third reference candidate borders, and all the third reference candidate borders in all the reference candidate border groups are sorted in ascending order according to areas, third reference candidate borders having a same sort position can be obtained from all the reference candidate borders, and the third reference candidate borders having a same sort position may be referred to as third target reference candidate borders.

For example, a quantity of the third reference candidate borders may be 1000, numbered from 1 to 1000, and a quantity of third reference candidate border groups may be 10, where third reference candidate borders in the first reference candidate border group are respectively numbered from 1 to 100, third reference candidate borders in the second reference candidate border group are respectively numbered from 101 to 200, and third reference candidate borders in the tenth reference candidate border group are numbered from 901 to 1000. The server may obtain a third candidate border numbered 50 from the first reference candidate border group as a third target reference candidate border, obtain a third reference candidate border numbered 150 from the second reference candidate border group as another third target reference candidate border, and yet another third reference candidate border numbered 950 from the tenth reference candidate border group as a third target reference candidate border.

In step 201(c)(vii), the server may deteiiuine all the obtained third target reference candidate borders as the second reference candidate borders.

The server may use a third target reference candidate border Obtained from each reference candidate border group as a second reference candidate border.

In step 201(d), the server may obtain a border feature of the second reference candidate border.

The border feature may include an aspect ratio, a border area, a coordinate position, a contrast between regions inside and outside a border, an average RGB value, and the like. With regard to the aspect ratio, the server may obtain a width and a height of the second reference candidate border, and use a ratio of the width to the height as the aspect ratio. With regard to the border area, the server may calculate the area of the second reference candidate border by using an area calculation method matching a shape of the border based on the shape of the second reference candidate border. With regard to the coordinate position, the server may establish a Cartesian coordinate system according to the reference picture in which the second reference candidate border is located, and further read coordinates of the second reference candidate border from the Cartesian coordinate system. With regard to the contrast between regions inside and outside a border, the server may obtain a contrast between light and dark regions inside and outside the second reference candidate border. With regard to the average RGB value, the server may obtain RGB values of respective pixels inside the second reference border, and use an average of the RGB values of respective pixels as the average RGB value.

In step 201(e), the server may determine a border parameter of a border feature of each dimension according to the border feature of the second reference candidate border and the corresponding tag value.

Based on the border feature of the second reference candidate border, the server may constitute a feature vector from the border feature of the second reference candidate border, and further, perform training according to the feature vector and a corresponding tag value to obtain a border parameter of a border feature of each dimension. Specifically, the server may determine a border parameter of an aspect ratio according to an aspect ratio in each feature vector and a corresponding tag value. The server may determine a border parameter of a border area according to a border area in each feature vector and a corresponding tag value. The server may determine a border parameter of a coordinate position according to a coordinate position in each feature vector and a corresponding tag value. The server may determine a border parameter of a contrast according to a contrast in each feature vector and a corresponding tag value. The server may determine a border parameter of an average RGB value according to an average RGB value in each feature vector and a corresponding tag value.

The border feature may have one dimension or a plurality of dimensions. In a case of one dimension, there is one border parameter of the border feature. In a case of a plurality of dimensions, there is a plurality of border parameters of the border feature.

In step 201(f), the server may construct the border detection model based on the border parameter of the border feature of each dimension.

The server may construct a border detection model based on a border parameter of a border feature of each dimension.

According to an embodiment, the border detection model may be established in advance before the border detection method provided in this embodiment is performed. An occasion for establishing a border detection model is not limited to the embodiments herein.

Figure 3:
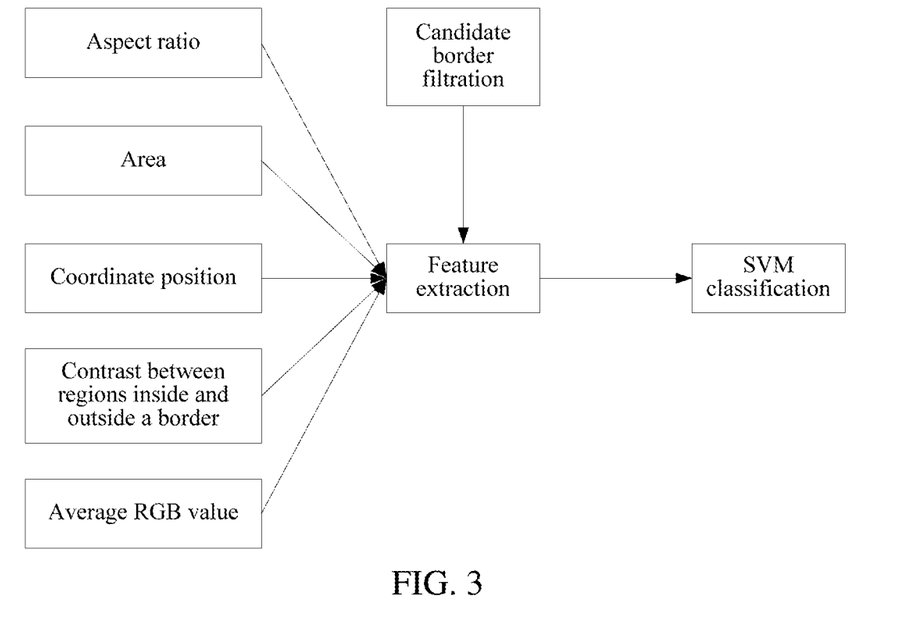
FIG. 3 is a framework diagram of a support vector machine classification algorithm in border detection according to an embodiment.

Referring to FIG. 3, after obtaining the first reference candidate borders, the server may obtain a second reference candidate border from the first reference candidate borders, extract a border feature, such as an aspect ratio, a border area, a coordinate position, a contrast between regions inside and outside a border, or an average RGB value, from each second reference candidate border, so as to construct the border detection model according to the extracted border feature.

In step 202, the server may obtain a to-be-detected picture.

A to-be-detected picture may include a target region. A manner in which the server obtains the to-be-detected picture may include, but is not limited to, a terminal photographing a document, a certificate, or the like, by using a camera, to obtain a picture corresponding to the document, the certificate, or the like, and transmitting the captured picture to the server through the picture border detection application, and after receiving the picture transmitted by the terminal, using the picture as the to-be-detected picture.

In step 203, the server may detect first straight line segments in the to-be-detected picture.

The server may perform detection on the to-be-detected picture by using the LSD to obtain first straight line segments. A quantity of the first straight line segments may be at least two.

In step 204, the server may generate first candidate borders of the target region according to the first straight line segments.

In a case that the server generates first candidate borders of the target region according to the first straight line segments, the following steps 204(a) to 204(c) may be used.

In step 204(a), the server may connect the first straight line segments to obtain second straight line segments.

Lengths of the first straight line segments may be less than lengths of the second straight line segments. During the connecting, the server may directly connect first straight line segments meeting connection conditions into second straight line segments through Hough transform.

In step 204(b), the server may obtain third straight line segments from the second straight line segments according to attribute information of to-be-generated first candidate borders.

The attribute information may include a quantity of borders and a relative positional relationship between borders of the first candidate borders. There is a plurality of groups of third straight line segments, a quantity of the third straight line segments of each group may be the same as the quantity of borders, and a relative positional relationship between the third straight line segments of each group may be the same as the relative positional relationship between borders.

In step 204(c), the server may generate the first candidate borders according to the third straight line segments.

In step 205, the server may obtain second candidate borders of the target region from the first candidate borders.

In a case that the server obtains a second candidate border of the target region from the first candidate borders, the following steps 205(a) to 205(g) may be performed.

In step 205(a), the server may obtain aspect ratios of the first candidate borders.

For a first reference candidate border enclosed by each group of third straight line segments, the server may obtain a width value and a height value of each first border, so as to obtain an aspect ratio of each first candidate border.

In step 205(b), the server may obtain third candidate borders from the first candidate borders according to the aspect ratios of the first candidate borders.

For a second candidate border in the target region, if its aspect ratio falls within a threshold range, and based on the threshold range, the server may select a first candidate border meeting the threshold range from the first candidate borders and use the first candidate border meeting the threshold range as a third candidate border.

In step 205(c), the server may obtain border areas of the third candidate borders.

The server may calculate border areas of the third reference candidate borders according to an area formula.

In step 205(d), the server may sort the third candidate borders in ascending order according to the border areas to obtain a sorting result.

After border areas of all the third candidate borders are calculated, the server may sort the third candidate borders in ascending order according to the border areas to obtain a sorting result.

In step 205(e), the server may divide the third candidate borders into a plurality of candidate border groups according to the sorting result.

Based on the obtained sorting result, to facilitate group division, the server may number the third candidate borders, so as to further divide the third candidate borders into different candidate border groups according to a number set for each third candidate border.

In step 205(f), the server may obtain, from all the candidate border groups, third target candidate borders having the same sort position in the groups.

In step 205(g), the server may determine all the obtained third target candidate borders as the second candidate borders.

In step 206, the server may obtain border features of the second candidate borders.

With regard to the aspect ratio in the border feature, the server may obtain a width and a height of the second candidate border, and set a ratio of the width to the height as the aspect ratio. With regard to the border area, the server may calculate the area of the second candidate border by using an area calculation method matching a shape of the border based on the shape of the second candidate border. With regard to the coordinate position in the border feature, the server may establish a Cartesian coordinate system according to the target picture in which the second candidate border is located, and further read coordinates of the second candidate border from the Cartesian coordinate system. With regard to the contrast between regions inside and outside a border in the border feature, the server may obtain a contrast between light and dark regions inside and outside the second candidate border. With regard to the average RGB value in the border feature, the server may obtain RGB values of respective pixels inside the second border, and use an average of the RGB values of respective pixels as the average RGB value.

In step 207, the server may obtain an actual border of the target region from the second candidate borders according to the border features of the second candidate borders and a border detection model.

In a case that the server obtains an actual border of the target region from the second candidate borders according to the border features of the second candidate borders and a border detection model, the server may input the border features of the second candidate borders into the border detection model to output detected values of the second candidate borders, and set the second candidate border as the actual border in a case that a detected value of the second candidate border is greater than a preset value. The preset value may be determined according to recognition precision of the border detection model, and the preset value may be, for example, 0.5, 0.6, or the like.

A detection process of a to-be-detected picture is described with reference to FIG. 4.

Figure 4:
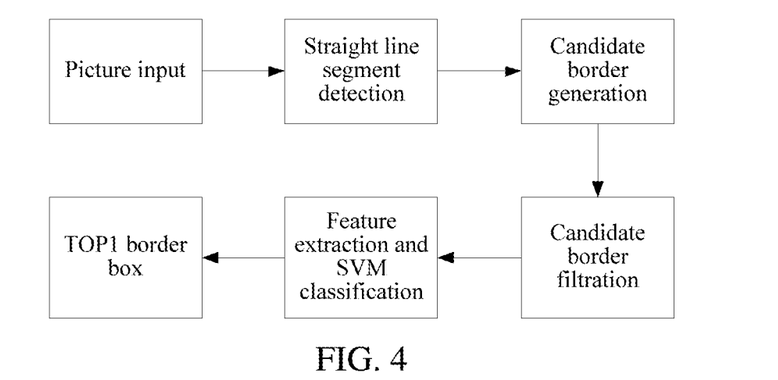
FIG. 4 is a schematic diagram of a border detection process according to an embodiment.

Referring to FIG. 4, for any to-be-detected picture inputted by the terminal, the server may detect first straight line segments of the to-be-detected picture by using the LSD algorithm, connect the first straight line segments to form candidate borders through Hough transform, filter the candidate borders, and extract border features of the filtered candidate borders, so as to obtain an actual border of a target region of the to-be-detected picture according to the border feature and the border detection model established in advance.

Notably, in the foregoing example, a border detection model may be constructed in advance, and a to-be-detected picture may be detected based on the constructed border detection model. In fact, a convolutional neural network in deep learning may alternatively be used to perform regression border corner points of a target region to implement border detection. In a case that training data completely covers a scenario in which the target region is located, and the model is properly designed, a convolutional neural network-based solution may replace a procedure based on straight line segment extraction—candidate border generation—SVM classification to implement end-to-end border detection.

In addition, after a plurality of first candidate borders is obtained, according to the method provided in the embodiments herein, a plurality of recognition modules may be designed to correspond to various scenarios, for example, a border detection scenario for a personal business card, a document, and a certificate, a business card recognition assistant office scenario for an enterprise or a product, and the like. In addition, different policies may be selected according to different requirements of different service scenarios for border detection accuracy. For example, when a requirement on border detection accuracy is relatively low in an application scenario, candidate borders may be reduced to improve system performance. In addition, the method provided in the embodiments herein may alternatively be used to detect all objects with a border, such as a mobile phone and a book According to an embodiment, a to-be-detected picture may be detected to generate first candidate borders, and second candidate borders may be selected from the first candidate borders. Further, an actual border of a target region may be obtained according to border features of the second candidate borders and a border detection model. The method does not depend on a selection rule, instead, detection may be performed based on border features and a border detection model. Therefore, a detection result is more accurate.

In addition to the foregoing beneficial effects, using the method provided in the embodiments of the present disclosure provide the following beneficial effects.

First, target regions in pictures with different scenes may be accurately cut out, and a target detection region may be rotated and corrected to facilitate subsequent display or a recognition task of Optical Character Recognition (OCR).

Second, feature extraction and a SVM classifier may be introduced to resolve a problem that an existing border detection algorithm is likely to be interfered by surrounding objects, so that the algorithm is more robust to different complex photographed scenes.

Third, to avoid subjectively setting a detection rule, more border detection scenarios may be covered by using a fixed feature extraction manner, so that algorithm application scenarios are more flexible.

Figure 5:
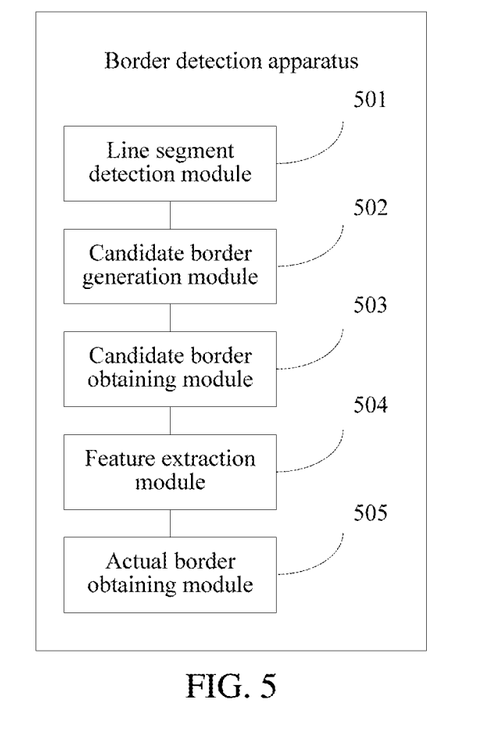
FIG. 5 is a schematic structural diagram of a border detection apparatus according to an embodiment.

Referring to FIG. 5, according to an embodiment, the apparatus for a border detection, disposed in a server, may include a line segment detection module 501 configured to detect first straight line segments in the to-be-detected picture, the to-be-detected picture including a target region of a to-be-determined border; a candidate border generation module 502 configured to generate first candidate borders of the target region according to the first straight line segments; a candidate border obtaining module 503 configured to obtain second candidate borders of the target region from the first candidate borders; a feature extraction module 504 configured to extract border features of the second candidate borders; and an actual border obtaining module 505 configured to obtain an actual border of the target region from the second candidate borders according to the border features of the second candidate borders and a border detection model, the border detection model being used to determine a detected value of each candidate border, and the detected value being used to represent a similarity between each candidate border and the actual border.

In another embodiment, the candidate border generation module 502 may be configured to connect the first straight line segments to obtain second straight line segments, where lengths of the first straight line segments is less than lengths of the second straight line segments; obtain third straight line segments from the second straight line segments according to attribute information of to-be-generated first candidate borders, the attribute information including a quantity of borders and a relative positional relationship between borders of the first candidate borders, a quantity of the third straight line segments being the same as the quantity of borders, and a relative positional relationship between the third straight line segments being the same as the relative positional relationship between borders; and generate the first candidate borders according to the third straight line segments.

In another embodiment, the candidate border obtaining module 503 may be configured to obtain aspect ratios of the first candidate borders; obtain third candidate borders from the first candidate borders according to the aspect ratios of the first candidate borders; obtain border areas of the third candidate borders; sort the third candidate borders in ascending order according to the border areas to obtain a sorting result; divide the third candidate borders into a plurality of candidate border groups according to the sorting result; obtain, from all the candidate border groups, third target candidate borders having a same sort position in the groups; and use all the obtained third target candidate borders as the second candidate borders.

According to another embodiment, the apparatus may further include a line segment detection module 501 configured to detect first reference straight lines segment in a reference picture, the reference picture including a reference region whose border has been determined; a candidate border generation module 502 configured to generate first reference candidate borders of the reference region according to the first reference straight line segments; a candidate border obtaining module 503 configured to obtain a second reference candidate border of the reference region from the first reference candidate borders, the second reference candidate border corresponding to a tag value, and the tag value being used to determine whether the second candidate border is an actual border of the reference region; a feature extraction module 504 configured to extract a border feature of the second reference candidate borders; a border parameter determining module configured to determine a border parameter of a border feature of each dimension according to the border feature of the second reference candidate border and the corresponding tag value; and a model construction module configured to construct the border detection model based on the border parameter of the border feature of each dimension.

In another embodiment, the actual border obtaining module 505 may be configured to input the border features of the second candidate borders into the border detection model, to output detected values of the second candidate borders, and use the second candidate border as the actual border in a case that a detected value of the second candidate border is greater than a preset value.

Accordingly, the apparatus provided in the embodiments herein may detect a to-be-detected picture to generate first candidate borders, select second candidate borders from the first candidate borders, and obtain an actual border of a target region according to border features of the second candidate borders and a border detection model. The method does not depend on a selection rule, instead, detection may be performed based on border features and a border detection model. Therefore, a detection result is more accurate.

Figure 6:
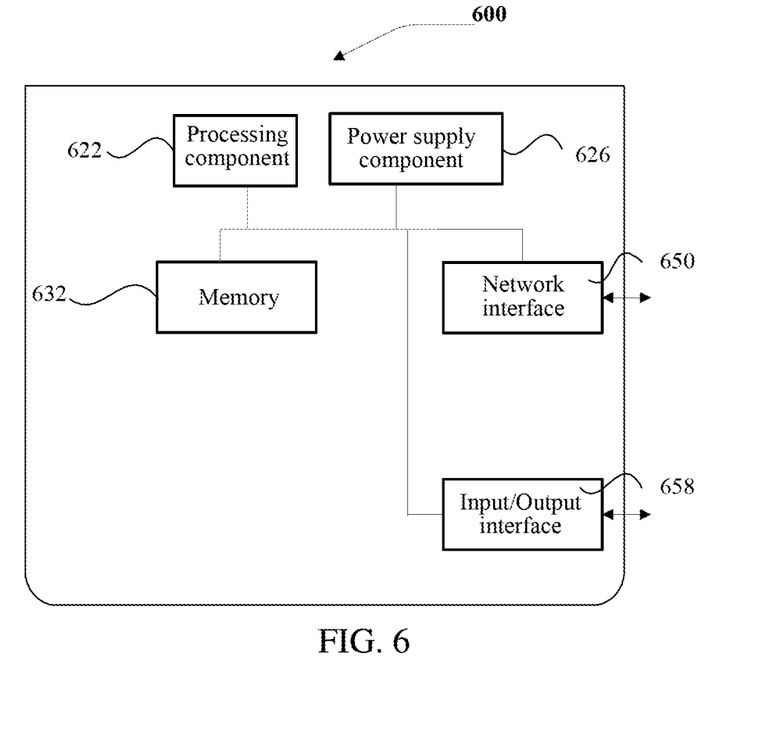
FIG. 6 shows a server for border detection according to an embodiment.

FIG. 6 shows a server for border detection according to an embodiment. Referring to FIG. 6, a server 600 may include a processing component 622, further including one or more processors, and a memory resource represented by a memory 632 configured to store at least one instruction, at least one program, a code set, or an instruction set that may be executed by the processing component 622. The at least one instruction, the at least one program, the code set, or the instruction set may be loaded by the processor to perform the border detection method shown in FIG. 2.

The server 600 may further include a power supply component 626 configured to perform power supply management of the server 600, a wired or wireless network interface 650 configured to connect the server 600 to a network, and an input/output (I/O) interface 658. The server 600 may operate an operating system that is stored in the memory 632. for example, Windows Server™, Mac OS X™, Unix™, Linux™, or FreeBSD™.

The server provided in the embodiments herein may detect a to-he-detected picture to generate first candidate borders, select second candidate borders from the first candidate borders, and obtain an actual border of a target region according to border features of the second candidate borders and a border detection model. The method does not depend on a selection rule, instead, detection may be performed based on border features and a border detection model. Therefore, a detection result is more accurate.

According to another embodiment, there is provided a non-transitory computer-readable storage medium, the storage medium storing at least one instruction, at least one program, a code set, or an instruction set, where the at least one instruction, the at least one program, the code set, or the instruction set may be loaded and executed by a processor to perform the border detection method shown in FIG. 2.

The computer-readable storage medium provided in this embodiment may detect a to-be-detected picture to generate first candidate borders, select second candidate borders from the first candidate borders, and obtain an actual border of a target region according to border features of the second candidate borders and a border detection model. The method does not depend on a selection rule, and instead, detection may be performed based on border features and a border detection model. Therefore, a detection result is more accurate.

During border detection of the border detection apparatus and the server provided in the foregoing embodiments, it is illustrated with examples of division of the foregoing functional modules. In practical application, the foregoing functions may be distributed to different functional modules according to requirements, that is, the internal structures of the border detection apparatus and the server may be divided into different functional modules to implement all or part of the functions described above. In addition, the border detection apparatus and the server provided in the foregoing embodiments may belong to the same concept as the embodiment of the border detection method. For a specific implementation process thereof, a person skilled in the art may refer to the border detection method described herein.

A person of ordinary skill in the art may understand that all or some of the steps of the embodiments may be implemented by hardware or software, a program instructing related hardware. The program may be stored in a computer readable storage medium. The storage medium may include a read-only memory, a magnetic disk, and an optical disc.

The foregoing descriptions are merely preferred embodiments in the embodiments of the present disclosure, and are not intended to limit the embodiments of the present disclosure. Any modification, equivalent replacement, or improvement made within the spirit and principle of the embodiments of the present disclosure shall fall within the protection scope of the present disclosure.

What is claimed is:

1. A border detection method, the method being performed by a server, the method comprising:

detecting a plurality of first straight line segments in a to-be-detected image, the to-be-detected image comprising a target region of a to-be-determined border;

generating a plurality of first candidate borders of the target region according to the plurality of first straight line segments;

obtaining a plurality of second candidate borders of the target region from the plurality of first candidate borders;

extracting border features of the plurality of second candidate borders; and obtaining an actual border of the target region from the plurality of second candidate borders according to the border features of the plurality of second candidate borders and a border detection model, the border detection model being used to determine a detected value of each candidate border, and the detected value representing a similarity between each candidate border and the actual border.

2. The method according to claim 1, wherein the generating the plurality of first candidate borders of the target region according to the plurality of first straight line segments further comprises:

connecting the plurality of first straight line segments to obtain a plurality of second straight line segments, in which lengths of the plurality of first straight line segments are less than lengths of the plurality of second straight line segments;

obtaining a plurality of third straight line segments from the plurality of second straight line segments according to attribute information of to-be-generated first candidate borders, the attribute information comprising a quantity of borders and a relative positional relationship between borders of the plurality of first candidate borders, a quantity of the plurality of third straight line segments being the same as the quantity of borders, and a relative positional relationship between the plurality of third straight line segments being the same as the relative positional relationship between borders; and generating the plurality of first candidate borders according to the plurality of third straight line segments.

3. The method according to claim 1, wherein the obtaining the plurality of second candidate borders of the target region from the plurality of first candidate borders further comprises:

obtaining aspect ratios of the plurality of first candidate borders;

obtaining a plurality of third candidate borders from the plurality of first candidate borders according to the aspect ratios of the plurality of first candidate borders;

obtaining border areas of the plurality of third candidate borders;

sorting the plurality of third candidate borders in ascending order according to the border areas to obtain a sorting result;

dividing the plurality of third candidate borders into a plurality of candidate border groups according to the sorting result;

obtaining, from all the plurality of candidate border groups, third target candidate borders having a same sort position in the plurality of candidate border groups; and using all the obtained third target candidate borders as the plurality of second candidate borders.

4. The method according to claim 3, wherein the method further comprises selecting one of the plurality of first reference candidate borders based on an aspect ratio of a reference region satisfying a threshold range.

5. The method according to claim 4, wherein a shape of one of the plurality of first reference candidate borders is a rectangle.

6. The method according to claim 1, wherein the obtaining the actual border of the target region from the plurality of second candidate borders according to the border features of the plurality of second candidate borders and the border detection model, further comprises:

detecting first reference straight lines segment in a reference image, the reference image comprising a reference region in which the actual border has been determined;

generating a plurality of first reference candidate borders of the reference region according to the plurality of first reference straight line segments;

obtaining a second reference candidate border of the reference region from the plurality of first reference candidate borders, the second reference candidate border corresponding to a tag value, and the tag value being used to determine whether the second candidate border is an actual border of the reference region;

extracting a border feature of the second reference candidate border;

determining a border parameter of a border feature of each dimension according to the border feature of the second reference candidate border and the corresponding tag value; and constructing the border detection model based on the border parameter of the border feature of each dimension.

7. The method according to claim 6, further comprising:

calculating an angle between each of a plurality of second reference straight line segments and a horizontal line; and determining a direction of each of the plurality of second reference straight line segments according to the angle between each of the plurality of second reference straight line segments and the horizontal line, to obtain a third reference straight line segment.

8. The method according to claim 1, wherein the obtaining the actual border of the target region from the plurality of second candidate borders according to the border features of the plurality of second candidate borders and the border detection model, further comprises:

inputting the border features of the plurality of second candidate borders into the border detection model;

outputting detected values of the plurality of second candidate borders; and using the plurality of second candidate borders as the actual border based on determining that a detected value of the second candidate border is greater than a preset value.

9. A border detection server, the server comprising:

at least one memory configured to store computer program code; and at least one processor configured to access the computer program code and operate as instructed by the computer program code, the computer program code comprising:

line segment detection code configured to cause the at least one processor to detect a plurality of first straight line segments in a to-be-detected image, the to-be-detected image comprising a target region of a to-be-determined border;

candidate border generation code configured to cause the at least one processor to generate a plurality of first candidate borders of the target region according to the plurality of first straight line segments;

candidate border obtaining code configured to cause the at least one processor to obtain a plurality of second candidate borders of the target region from the plurality of first candidate borders;

feature extraction code configured to cause the at least one processor to extract border features of the plurality of second candidate borders; and actual border obtaining code configured to cause the at least one processor to obtain an actual border of the target region from the plurality of second candidate borders according to the border features of the plurality of second candidate borders and a border detection model, the border detection model being used to determine a detected value of each candidate border, and the detected value representing a similarity between each candidate border and the actual border.

10. The border detection server according to claim 9, further comprising:

the candidate border generation code further configured to cause the at least one processor to:

connect the plurality of first straight line segments to obtain the plurality of second straight line segments, in which lengths of the plurality of first straight line segments are less than lengths of the plurality of second straight line segments;

obtain a plurality of third straight line segments from the plurality of second straight line segments according to attribute information of to-be-generated first candidate borders, the attribute information comprising a quantity of borders and a relative positional relationship between borders of the plurality of first candidate borders, a quantity of the plurality of third straight line segments being the same as the quantity of borders, and a relative positional relationship between the plurality of third straight line segments being the same as the relative positional relationship between borders; and generate the plurality of first candidate borders according to the plurality of third straight line segments.

11. The border detection server according to claim 9, further comprising:

the candidate border obtaining code further configured to cause the at least one processor to:

obtain aspect ratios of the plurality of first candidate borders;

obtain a plurality of third candidate borders from the plurality of first candidate borders according to the aspect ratios of the plurality of first candidate borders;

obtain border areas of the plurality of third candidate borders;

sort the plurality of third candidate borders in ascending order according to the border areas to obtain a sorting result;

divide the plurality of third candidate borders into a plurality of candidate border groups according to the sorting result;

obtain, from all the plurality of candidate border groups, third target candidate borders having a same sort position in the plurality of candidate border groups; and use all the obtained third target candidate borders as the plurality of second candidate borders.

12. The border detection server according to claim 9, further comprising:

the line segment detection code further configured to cause the at least one processor to detect first reference straight lines segment in a reference image, the reference image comprising a reference region in which the actual border has been determined;

the candidate border generation code further configured to cause the at least one processor to generate a plurality of first reference candidate borders of the reference region according to the plurality of first reference straight line segments;

the candidate border obtaining code further configured to cause the at least one processor to obtain a second reference candidate border of the reference region from the first reference candidate borders, the second reference candidate border corresponding to a tag value, and the tag value being used to determine whether the second candidate border is an actual border of the reference region;

the feature extraction code further configured to cause the at least one processor to extract a border feature of the second reference candidate border;

border parameter determining code further configured to cause the at least one processor to determine a border parameter of a border feature of each dimension according to the border feature of the second reference candidate border and the corresponding tag value; and model construction code further configured to cause the at least one processor to construct the border detection model based on the border parameter of the border feature of each dimension.

13. The border detection server according to claim 12, further comprising the line segment detection code further configured to cause the at least one processor to:

calculate an angle between each of a plurality of second reference straight line segments and a horizontal line; and determine a direction of each of the plurality of second reference straight line segments according to the angle between each of the plurality of second reference straight line segments and the horizontal line, to obtain a third reference straight line segment.

14. The server according to claim 9, wherein the actual border obtaining code is further configured to cause the at least one processor to:

input the border features of the plurality of second candidate borders into the border detection model:

output detected values of the plurality of second candidate borders; and use the plurality of second candidate borders as the actual border based on determining that a detected value of the second candidate border is greater than a preset value.

15. A non-transitory computer-readable storage medium, storing executable instructions, the executable instructions capable of causing a computer to:

detect a plurality of first straight line segments in a to-be-detected image, the to-be-detected image comprising a target region of a to-be-determined border;

generate a plurality of first candidate borders of the target region according to the plurality of first straight line segments;

obtain a plurality of second candidate borders of the target region from the plurality of first candidate borders;

extract border features of the plurality of second candidate borders; and obtain an actual border of the target region from the plurality of second candidate borders according to the border features of the plurality of second candidate borders and a border detection model, the border detection model being used to determine a detected value of each candidate border, and the detected value representing a similarity between each candidate border and the actual border.

16. The non-transitory computer-readable storage medium according to claim 15, wherein the executable instructions are further capable of causing the computer to:
   connect the plurality of first straight line segments to obtain a plurality of second straight line segments, in which lengths of the plurality of first straight line segments are less than lengths of the plurality of second straight line segments;
   obtain a plurality of third straight line segments from the plurality of second straight line segments according to attribute information of to-be-generated first candidate borders, the attribute information comprising a quantity of borders and a relative positional relationship between borders of the plurality of first candidate borders, a quantity of the plurality of third straight line segments being the same as the quantity of borders, and a relative positional relationship between the plurality of third straight line segments being the same as the relative positional relationship between borders; and
   generate the plurality of first candidate borders according to the plurality of third straight line segments.

17. The non-transitory computer-readable storage medium according to claim 15, wherein the executable instructions are further capable of causing the computer to:
   obtain aspect ratios of the plurality of first candidate borders;
   obtain a plurality of third candidate borders from the plurality of first candidate borders according to the aspect ratios of the plurality of first candidate borders;
   obtain border areas of the plurality of third candidate borders;
   sort the plurality of third candidate borders in ascending order according to the border areas to obtain a sorting result;
   divide the plurality of third candidate borders into a plurality of candidate border groups according to the sorting result;
   obtain, from all the plurality of candidate border groups, third target candidate borders having a same sort position in the plurality of candidate border groups; and
   use all the obtained third target candidate borders as the plurality of second candidate borders.

18. The non-transitory computer-readable storage medium according to claim 15, wherein the executable instructions are further capable of causing the computer to:
   detect first reference straight lines segment in a reference image, the reference image comprising a reference region in which the actual border has been determined;
   generate a plurality of first reference candidate borders of the reference region according to the plurality of first reference straight line segments;
   obtain a second reference candidate border of the reference region from the first reference candidate borders, the second reference candidate border corresponding to a tag value, and the tag value being used to determine whether the second candidate border is an actual border of the reference region;
   extract a border feature of the second reference candidate border;
   determine a border parameter of a border feature of each dimension according to the border feature of the second reference candidate border and the corresponding tag value; and
   construct the border detection model based on the border parameter of the border feature of each dimension.

19. The non-transitory computer-readable storage medium according to claim 18, wherein the executable instructions are further capable of causing the computer to:
   calculate an angle between each of a plurality of second reference straight line segments and a horizontal line; and
   determine a direction of each of the plurality of second reference straight line segments according to the angle between each of the plurality of second reference straight line segments and the horizontal line, to obtain a third reference straight line segment.

20. The non-transitory computer-readable storage medium according to claim 15, wherein the executable instructions are further capable of causing the computer to:
   input the border features of the plurality of second candidate borders into the border detection model;
   output detected values of the plurality of second candidate borders; and
   use the plurality of second candidate borders as the actual border based on determining that a detected value of the second candidate border is greater than a preset value.

* * * * *